United States Patent [19]

Arragon

[11] Patent Number: 4,535,449
[45] Date of Patent: Aug. 13, 1985

[54] TIME-LOCKING METHOD FOR STATIONS WHICH FORM PART OF A LOCAL LOOP NETWORK, AND LOCAL LOOP NETWORK FOR PERFORMING THIS TIME-LOCKING METHOD

[75] Inventor: Jean-Pierre Arragon, Roissy, France

[73] Assignee: U.S. Philips Corporation, New York, N.Y.

[21] Appl. No.: 490,619

[22] Filed: May 2, 1983

[30] Foreign Application Priority Data

Apr. 30, 1982 [FR] France ............................ 82 07536

[51] Int. Cl.³ .............................................. H04J 3/00
[52] U.S. Cl. .................................. 370/86; 340/825.05
[58] Field of Search ........................... 370/86, 100, 85; 340/825.05

[56] References Cited

U.S. PATENT DOCUMENTS

| | | | |
|---|---|---|---|
| 3,940,561 | 2/1976 | Heinze et al. | 370/86 |
| 4,002,842 | 1/1977 | Meyr et al. | 370/86 |
| 4,430,699 | 2/1984 | Segarra et al. | 364/200 |
| 4,435,705 | 3/1984 | Stevens | 370/86 |

Primary Examiner—Douglas W. Olms
Assistant Examiner—Kenneth I. Rokoff
Attorney, Agent, or Firm—Jack E. Haken; James J. Cannon, Jr.

[57] ABSTRACT

A method for use in a local loop network comprising a plurality of stations which are distributed along a bus, each station being connected to the bus via a coupler which is inserted in the bus. The time-locking method for these stations comprises a transmission phase during which a looping unit which is also inserted in the bus transmits a frame (transmission frame) which consists of a synchronization word and one or more slots which initially do not contain data and which correspond to the time position occupied by each of the stations, a receiving phase during which the demodulation of the transmission frame by the master clock of the looping unit is performed after the retransmission in the form of a frame which is referred to as the receiving frame, of this frame to the coupler of each of the successive stations and, after the receiving phase, new transmission and receiving phases until the insertion of the data on the bus by each station during a transmission phase takes place with the desired accuracy.

12 Claims, 7 Drawing Figures

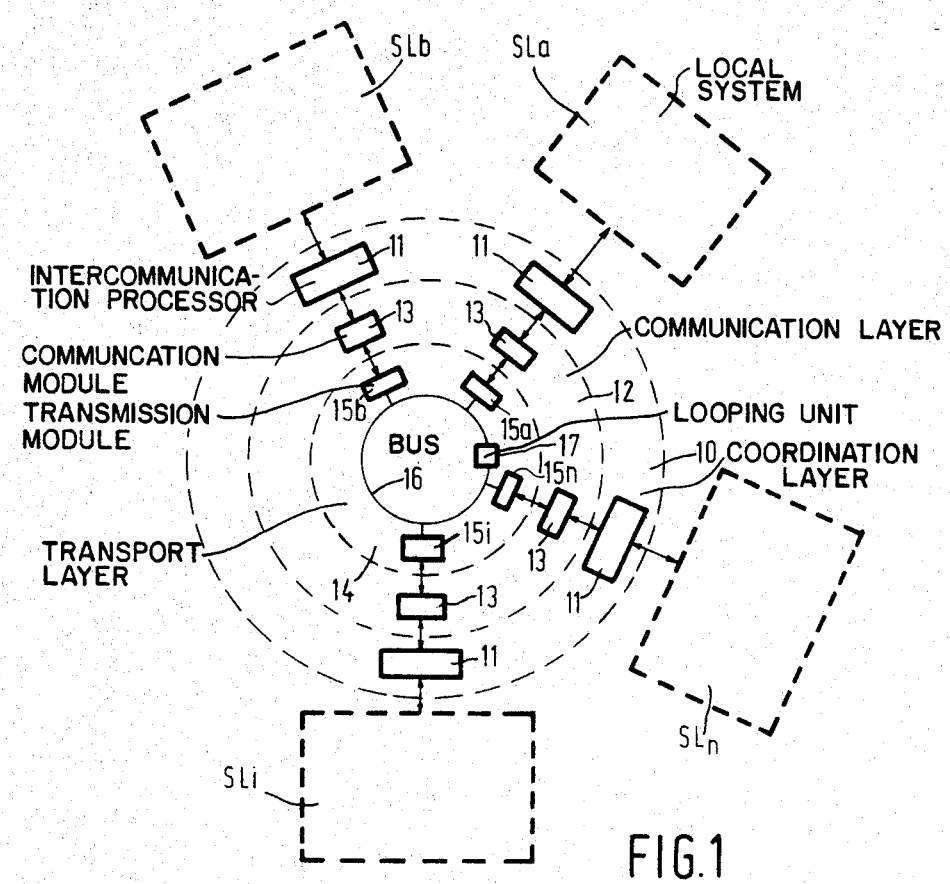
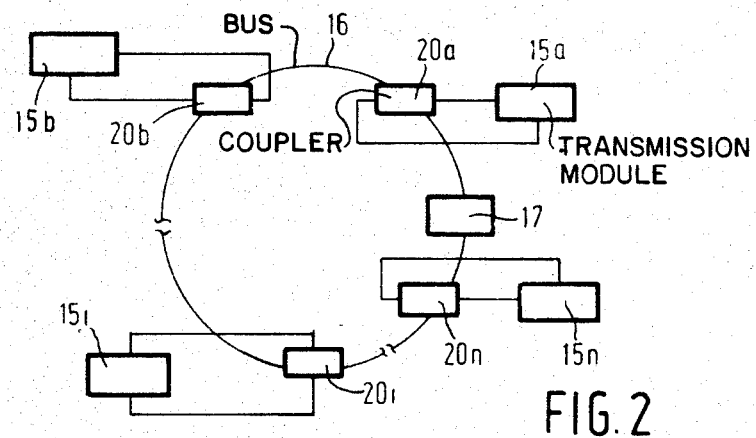

TIME-LOCKING METHOD FOR STATIONS WHICH FORM PART OF A LOCAL LOOP NETWORK, AND LOCAL LOOP NETWORK FOR PERFORMING THIS TIME-LOCKING METHOD

BACKGROUND OF THE INVENTION

1. Field of the Invention

The invention relates to a time-locking method for a local loop network comprising a plurality of stations which are distributed along a bus, each station being connected to the bus by way of a coupler, said bus comprising a looping unit inserted in the bus, said method comprising inter alia an initialization phase for allocating to each station a time reference with respect to a master clock of the looping unit.

2. Description of the Prior Art

A method of this kind is used in a local loop network which is described in U.S. Pat. Ser. No. 235,291, filed Feb. 17, 1981, now U.S. Pat. No. 4,430,699. Information transmitted by an arbitrary station forming part of the local loop network circulates on the bus from coupler to coupler. The looping unit provides the main synchronization of the network and each of the stations synchronizes itself during the initialization phase, for example, with the aid of a phase-locked loop which enables the station to find this synchronization. The looping unit acts as the "master" and the couplers act as "slaves". The transmission of the information between the coupler and the station itself requires a given period of time because the information must travel through the link which connects the station to the coupler. The following problem occurs: a station which is coupled to the bus has access to data circulating on the bus only during a period $t_1$ after their passage at the level of the coupler. Information transmitted by the station requires a period $t_2$ in order to travel from the station to the coupler ($t_2$ represents the propagation time in the link between the station and the coupler). This means that during the period $t_1 + t_2$ the bus will be unoccupied, so that the bus is used less efficiently.

SUMMARY OF THE INVENTION

It is the object of the invention to provide a time-locking method for the stations in order to determine the correct instant at which a station should transmit, thus reducing the idleness of the bus.

A method in accordance with the invention is characterized in that the initialization phase forms part of a transmission phase which comprises the following steps:

(a) the transmission of a frame, referred to as the transmission frame, by the looping unit, said transmission frame comprising:
  a synchronization word which initializes the transmission and initialization phase,
  at least one slot which initially does not contain data and which has for each station a different position with respect to the position of the synchronization word, said position corresponding to the time position occupied by each station in the transmission frame;

(b) the generating of a transmission command by at least one station after the transmission of the synchronization word;

(d) the insertion, by the station and under the control of the transmission command, of a word into the empty slot allocated to the station;

said transmission phase being followed by a receiving phase which comprises the following steps:

(a) the demodulation of the transmission frame by the looping unit;

(b) the retransmission, in the form of a frame which is referred to as the receiving frame, of said demodulated transmission frame by the looping unit;

(c) the measurement by the station of the delay, with respect to the beginning of the slot allocated thereto, with which the word has been inserted into the allocated slot by the station during the transmission phase;

(d) the storage by the station of the measured delay value in order to enable the station to advance the insertion of a word into the allocated slot during a next transmission by a period which corresponds to the delay value.

The allocation of at least one slot which initially does not contain data to a station during the transmission phase enables this station to insert a word into the allocated slot. Due to the propagation time in the link between the coupler and the station, the word will be inserted with a delay with respect to the beginning of the slot. During the receiving phase, the station will again read the word it has inserted into the allocated slot and will measure the delay, with respect to the beginning of the slot, with which the word has been inserted. Knowing the value of this delay enables the station to take into account this delay value for a next transmission in order to correctly determine the instant at which it should transmit.

The advantages of this method are essentially the ease of connection for the user who wishes to connect his station to the bus via, for example, optical fibers. Actually, the time-locking device allows for a substantial variation of the length of the fibers without any precision being required over this length. A further advantage of the method is that locking is automatic (no manual intervention, automatic locking in the case of repairs or replacement of fibers, or variations in propagation time due to temperature variations or due to the ageing of the components).

A first preferred embodiment of a time-locking method in accordance with the invention is characterized in that a word inserted during the insertion step of the transmission phase comprises several bits, said word being inserted with a delay of several bits with respect to the beginning of said empty slot, said measurement of the delay during the receiving phase being a measurement based on the number of bits of delay, said receiving phase being followed by a further transmission phase which comprises the following steps:

(a) the transmission of a new transmission frame, by the looping unit, said new transmission frame comprising:
  a synchronization word which initializes the transmission phase;
  at least one said slot which initially does not contain data;

(b) the determination, taking into account the measured value of the delay, of the instant at which the transmission command must be generated;

(c) the generating of the transmission command;

(d) the insertion of a word into the empty slot allocated to the station with a delay which is less than or equal to one bit with respect to the beginning of said empty slot and under the control of the transmission command;

said further transmission phase being followed by the receiving phase. Thus, a time-locking method is obtained in which the correct instant at which a station should transmit is determined with an accuracy which is equal to or smaller than one bit.

A second preferred embodiment of a time-locking method in accordance with the invention is characterized in that the receiving phase following the further transmission phase is followed by so many further transmission phases and receiving phases that the first bit of the word inserted int the allocated slot occupies a correct position with respect to the beginning of the slot and that the complete word is inserted in the slot allocated to the station. Thus, a time-locking method is obtained in which the correct instant at which a station should transmit is determined with an accuracy which is substantially smaller than one bit.

Preferably, a time-locking method in accordance with the invention is characterized in that said measurement of the delay is performed by counting the clock pulses which separate the beginning of the allocated slot and the beginning of the word inserted in the slot. Due to the presence of a master clock in the looping unit, the counting of the clock pulses offers a simple solution for the measurement of the delay time.

The invention also relates to a local loop network for performing the time-locking method in accordance with the invention. A local loop network of this kind is notably characterized in that each station comprises:
  (a) a slot control device which serves to verify, during the transmission phase as well as during the receiving phase, whether the slots appearing are indeed those which have been allocated;
  (b) a counter for counting the delay between said beginning of the slot and the beginning of the word inserted in the slot, an input of said counter being connected to the slot control device in order to receive a signal indicating the beginning of the allocated slot;
  (c) a locking device which comprises a first input which is connected to the output of said counter in order to receive the delay value and a second input which is connected to the slot control device in order to receive a signal which indicates the beginning of the allocated slot, said locking device comprising a generator for generating transmission commands, an output of said locking device being connected to the coupler.

A first preferred embodiment of a local loop network in accordance with the invention is characterized in that the generator of said locking device comprises:
  (a) a first shift register which comprises a parallel input and a series output for the storage of the word to be inserted;
  (b) a second shift register which comprises several parallel, shifted outputs which are connected, by way of a first multiplexer, to a control input of the first register;
  (c) a pulse generator for generating pulses at the signalization frequency, an output of said generator being connected to the first and to the second shift register and also to the counter;
  (d) a memory for storing said delay value, an input of said memory being connected to the counter in order to receive the delay value, an output of said memory being connected to the first multiplexer in order to select a parallel output of said second register.

The use of shift registers with a multiplexer which is controlled by the pulse generator enables determination of the correct instant at which the station should transmit a message, taking into account the measured delay value which is stored in the memory.

A second preferred embodiment of a local loop network in accordance with the invention is characterized in that the slot control device comprises a first and a second counter which count the word frequency, an input thereof being connected to the coupler while an output is connected to a first and to a second verification circuit, respectively. A control device having a comparatively simple construction is thus obtained.

A further preferred embodiment of a local loop network in accordance with the invention is characterized in that the series output of the first shift register is connected to an input of a delay line having a series input and parallel outputs shifted through a fraction of the maximum delay of said delay line, said parallel shifted outputs of said delay line being connected to a second multiplexer, an output of which is connected to the coupler and a control input of which is connected to the counter via the memory. Thus, a time-locking is obtained in which the word is inserted with a delay which is smaller than a fraction of a bit, for example, one tenth of a bit in the case of a delay line which introduces a delay by one bit and which comprises ten shifted parallel outputs.

The bus of the local loop network in accordance with the invention is preferably an optical bus.

The invention is preferably used in a microcomputer network with only a small geographical dispersion.

BRIEF DESCRIPTION OF THE DRAWINGS

Other aspects and advantages of the invention will appear in detail from the following description which will be given, by way of a non-limitative example, with reference to the accompanying drawings; therein:

FIG. 1 diagrammatically shows the general organization, in the form of functional layers which are concentrically arranged around the looped optical bus, of a multiplex data transmission and data processing system which comprises a time-locking device for stations in accordance with the invention;

FIG. 2 illustrates the coupling of the transmission modules to the optical bus;

DESCRIPTION OF THE PREFERRED EMBODIMENTS

Figure 3:
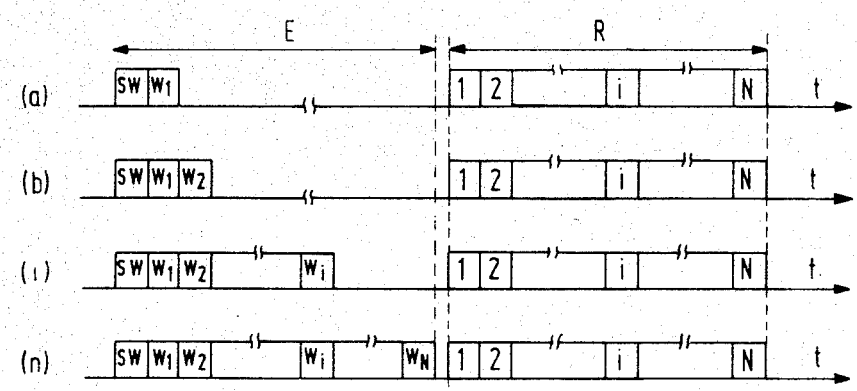
FIGS. 3a through 3n illustrate how the stations transmit and receive in the time slots allocated thereto on the optical bus.

The data processing system illustrated in FIG. 1 comprises several local systems $SL_a$, $SL_b$, ... $SL_i$, ... $SL_n$. This data processing system comprises an assembly of three functional "layers" which are concentrically shown and which are successively referred to as the coordination layer 10, the communication layer 12, the transport layer 14 and, in the center of the three layers, the actual communication network or data circulation bus 16.

The coordination layer 10 is managed by intercommunication processors 11 which comprise special hardware and software which provide the various coordination, communication, control initialization functions for the associated local systems $SL_a$, $SL_b$, ... $SL_i$, ... $SL_n$. The communication layer 12 is managed by communication modules 13 which are associated with the various local systems and which also comprises special hardware and software which provide the management of the communication protocols between these local systems, that is to say, the management of the means for establishing the logic links, for controlling the output of data, for presenting general events at the level of each local system $SL_i$, and for the detection of errors. The transport layer 14 comprises transmission modules 15, a looped optical bus 16 and a looping unit 17; the modules 15 themselves comprise special hardware and software for maintaining the synchronization between the communication modules 13 and the optical bus 16, for performing the electro-optical and opto-electronic conversions, and for checking for parity errors; the looping unit itself comprises special hardware and software for the encoding and decoding of each transmission frame on the optical bus 16, thus ensuring correct transmission and reception of the data in the time slots allocated to each local system $SL_i$, and for managing the initialization procedure enabling the synchronization of the transmission of the bus 16. A looping unit is described in U.S. Pat. No. 4,430,699. To this end, the looping unit notably comprises a master clock.

In the described embodiment the bus 16 is provided in order to establish the interconnection in a loop organization in which each station $SL_i$ operates with an output of 350 kwords of 16 bits per second; however, such an embodiment does not restrict the invention in any way. The transmission on the bus is synchronous and is organized according to the time multiplex principle. In the example shown in FIG. 2, each of the transmission modules 15a through 15n is connected to the bus 16 by means of couplers 20a through 20n. A transmission frame transmitted by the transmission module of the station is inserted by passive coupling on the bus, indicating that the words constituting the transmission frame are inserted one after the other in time slots. Each coupler 20i has a time slot available for the transmission of data. Depending on the number of stations connected and their relevant requirements, it is possible to assign one or more time slots to the same coupler so that maximum use of the bus is achieved. The assignment of one or more time slots to the same coupler is performed by the looping unit 17. In the chosen example the time slot is the same for each station. The configuration of the system is formed, prior to its being put into operation, by the allocation in advance of the time slots in accordance with the real number of stations present with respect to the maximum number possible.

In order to ensure that the allocation of the time slots of necessarily limited length to each coupler 20i is correctly performed, time-locking is absolutely necessary for each station. According to the present invention such locking is automatically performed as follows: the exchange of information between two arbitrary stations requires two cycles, taking into account the unidirectional organization of the looped bus 16; these two cycles are a transmission phase or write phase E, during which all stations have the opportunity to transmit their words, and a receiving or read phase R by these same stations. During these exchanges, the main synchronization of the network is ensured by the looping unit 17 and each of the stations performs its own synchronization with the aid of a phase-locked loop which permits the station to find this main synchronization (the looping unit acts as the "master" and the couplers as "slaves").

During the transmission phase (see the FIGS. 3a through 3n, part E), the looping unit 17 in the looped bus 16 transmits a frame, referred to as the transmission frame, which comprises first of all a synchronization word SW which is followed by several time slots which are void of data but which comprise for the stations a specific pattern which allows these stations to find the main synchronization by maintaining the receiving clock phase in each transmission module throughout the operation. The synchronization word serves on the one hand to inform the stations that the transmission phase prevails and on the other hand to impart a time reference successively to each of the stations via their relevant coupler 20i. The time slots serve to permit the insertion, by passive coupling on the bus 16, of different words which are to be transmitted by the stations and which are referred to as $W_1$, $W_2$, $W_3$, ..., $W_i$, ... $W_n$.

During the receiving phase, provided by demodulation of the transmission frame by the master clock contained in the looping unit 17 and the retransmission of this frame, the frame thus retransmitted (referred to as the receiving frame) is successively received by each of the stations which perform a read operation. The FIGS. 3a through 3n (part R) which correspond to the state of the frames in front of each of the relevant stations suitably illustrate the progressive writing, during the phase E, of the words transmitted by the stations in the slots allocated thereto and, during the phase R, the reading of these words after demodulation and recopying by the looping unit 17.

Upon its return to the looping unit 17, the receiving frame is erased and replaced by a new transmission frame which consists of a new synchronization word and slots which are again void of data and which are progressively filled again during the new transmission phase. This new transmission phase will be fofllowed by a new retransmission phase, which itself is followed by a new receiving phase, and so on.

Supposing, for example, that there is a network in which each station operates with an output of 350 kwords (of 16 bits per word) per second. Because, after encoding, each 16-bit word becomes a 24-bit word, taking into account the addition of a procedure bit and a parity bit enabling the detection of errors, and supposing that there are, for example, eight stations, an effective frame thus comprises $24 \times 17 = 408$ bits (because it contains 17 words: a synchronization word, eight transmission words, eight receiving words). The signalization frequency $f_s$ then equals 408 bits times the frequency of the words, which itself is equal to approximately 344 kHz, so the value of the frequency $f_s$ announce to 140.4 mHz.

Figures 4, 5:
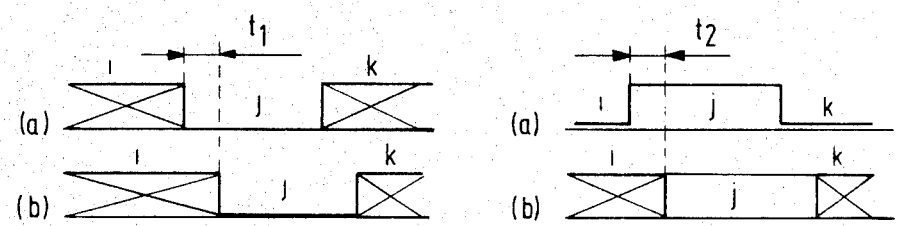
FIGS. 4a, 4b and 5a, 5b show the delays with respect to the insertion of the data on the bus and at the reception of data therefrom.

The following description concerns the use of these transmission and receiving frames for performing automatic time-locking of the stations. The problem is as follows: an arbitrary station ($st_i$) which is coupled to the bus 16 does not have access to the data which circulate on this bus at the instant of their passage at the level of the corresponding coupler, but only after a time interval $t_1$ (see the FIGS. 4a and 4b which show this shift on the slots i, j, k) and, conversely, the insertion of its own data on the bus by the station can be correct only if the station transmits these data with an advance equal to $t_2$ (see the FIGS. 5a and 5b) with respect to the beginning of the time slot j allocated thereto on the bus. These time intervals $t_1$ and $t_2$ represent the propagation time through $L_1$ meters of optical fiber, increased by the propagation time $t_r$ in the receiver, and the propagation time through $L_2$ meters of optical fiber, increased by the propagation time $t_e$ in the transmitter, respectively. If v is the speed of propagation in the optical fiber, these time intervals are expressed as:

$t_1 = L_1/v + t_r$ $t_2 = L_2/v + t_e$

Thus, for each station $SL_i$ the correct instant of transmission must be determined in order to ensure that the data are inserted in the relevant time slot without overlapping into neighboring slots.

This determination is performed as follows. The initialization of the transmission is performed sequentially according to a "handshake" procedure, for the looping unit/transmission module. The looping unit first transmits the synchronization word SW, after which it allocates an empty slot to the first station. The remainder of the frame is occupied by the looping unit which transmits, (by way of its master clock) or repeats, depending on whether a transmission or a receiving phase is concerned, a particular pattern in all other slots, corresponding to a maximum energy of the Nyquist frequency, in order to ensure perfect synchronization of the stations.

The first station is temporarily locked in several frames. A particular word despatched by the station at the end of locking informs the looping unit that this operation has been terminated. The looping unit subsequently indicates the next station and displaces its empty slot by one word (24 bits). If there is no response from a station, either because it is defective or because no station is connected, the looping unit itself acts as the station and imposes the same pattern as previously. A quasi-constant continuous component is thus preserved, regardless of the number of connected stations.

In the case where not all stations need be interconnected, it is possible to assign two time slots to the same station, depending on the configuration and the requirements of a system or an application. A time slot preferably has the same duration for each station. Thus, initially the reception of the synchronization word may be considered to give a time reference to the station during the receiving phase.

Taking into account the maximum and minimum forward/return propagation times between a coupler and the corresponding station (the real value is not yet known during the initialization, because it depends on the length of the fiber used and on the exact propagation time in the circuits) each station (except when it is absent, that is to say when it is not connected or out of service, the looping unit 17 immediately adapting itself to such a situation as mentioned above) transmits the word to be transmitted so that it is inserted into the first empty slot with a delay. After measurement of this delay during the subsequent receiving phase, the correct instant of transmission for the other stations is deduced therefrom during the subsequent transmission phase.

During the next cycle, the stations should transmit their respective slots in advance with respect to the synchronization received because of the propagation time between the associated coupler and station. This locking is realized as will be described in detail hereinafter.

Figure 6:
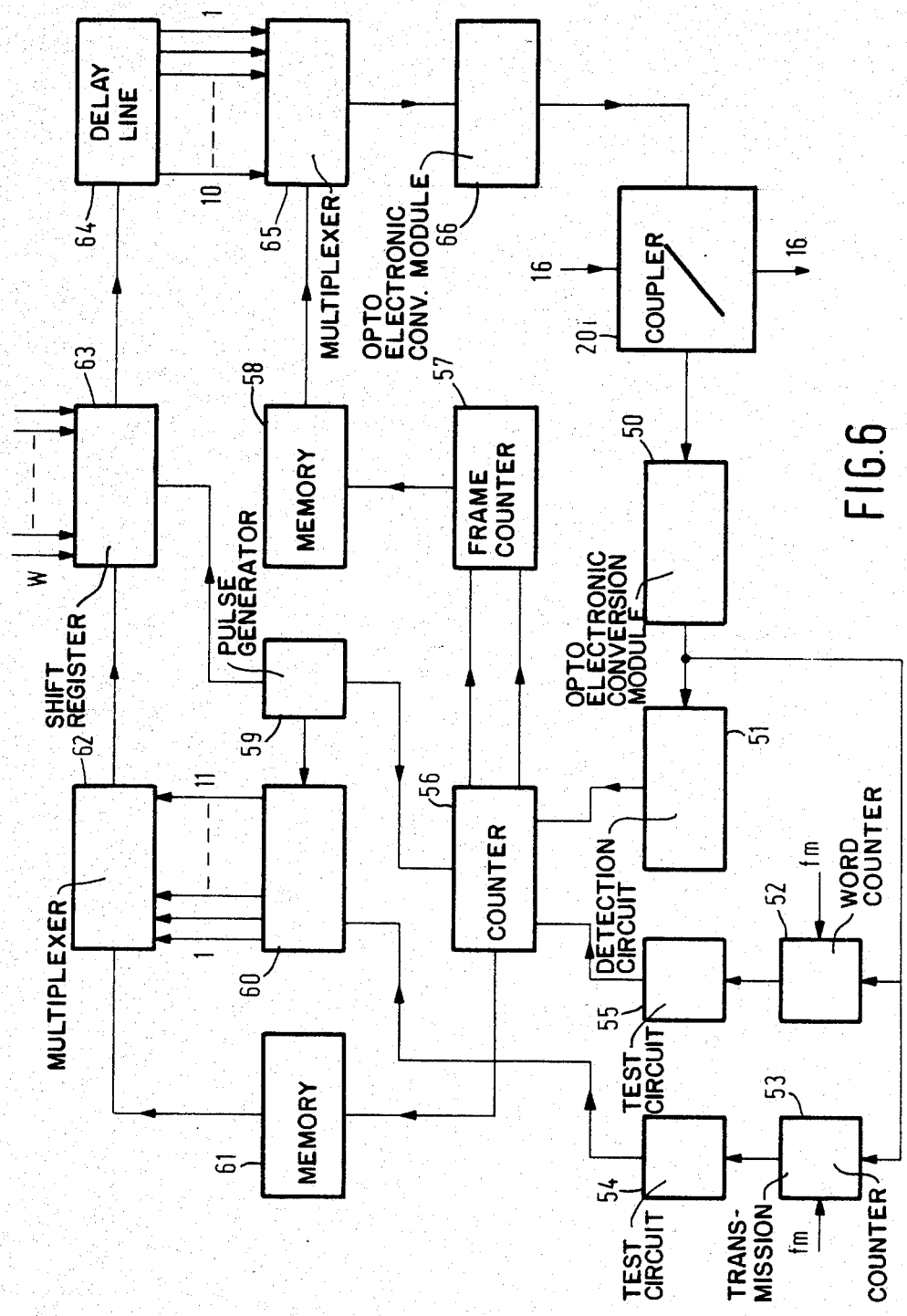
FIG. 6 shows an automatic time-locking circuit of a transmission module.

FIG. 6 shows an automatic time-locking circuit of a transmission module. This circuit comprises an opto-electronic conversion module 66 for the transmission and an opto-electronic conversion module 50 for the reception of a word W to be transmitted by a station i via its coupler 20i. The word W to be transmitted is loaded into a shift register 63 whose command defines the transmission instant for said station i. The signal for this command is despatched by an n-bit shift register 60 which is activated at the signalization frequency $f_s$ and whose n outputs are multiplexed in a multiplexer 62. The signalization frequency $f_s$ is generated by a pulse generator 59. The generating of $f_s$ does not take place in an autonomous clock unit. The Great unit comprises a unique master clock whereto each of the stations is successively locked while adapting the phase of its own clock (slave) to the data received during the receiving phase. The generation of $f_s$ may thus be provided by a phase locked loop which adapts the phase to the signalization frequency desired for the looping unit. This phase locked loop is formed during the initialization phase.

The shift start command is applied to the register 60 by a control signal which verifies whether the slot allocated to the station is the correct one and which comprises for this purpose a transmission word counter 53 and a test circuit 54 in order to perform a comparison with the address of the preceding station.

To this end, the transmission word counter 53 counts the transmitted words at the word frequency (presented to the input $f_m$) and verifies, by way of the test circuit 54, whether the slot allocated is indeed the correct one. Said comparison with the address of the preceding station is performed, for example, by storing the address of the preceding station in the memory in advance. The counting of the counter for the transmission words starts upon the reception of the synchronization word from the output of the opto-electronic conversion module 50. During the circulation of the first transmission frame, the station selects for the control of the register 63 the $n^{th}$ output of the register 60 so that the transmission is performed with a maximum delay. During the circulation of the first subsequent receiving frame, a control circuit which comprises for this purpose a words received counter 52 and a test circuit 55 for the address of the station verifies whether the station is actually the one which should receive. Therefore, the words received counter 52 counts at the frequency of the words (presented to the input $f_m$), received and verifies, by way of the test circuit 55, whether the station is indeed the one which should receive. The verification is performed, for example, on the basis of the address. The counting of the counter for the words received starts upon reception of the first word of the first receiving frame from the output of the opto-electronic conversion module 50. When said control circuit (52, 55) has determined that the station is indeed the one which should receive, it despatches a command to start the counting by the counter 56. The counter 56 thus starts to count, at the signalization frequency ($f_s$), the number of clock pulses which separate this start of counting from the beginning of the word transmitted by the station in the slot allocated during the first transmission frame. The first bit of this word in the allocated slot is detected by the detection circuit 51 which then generates a control signal which stops the counter 56. Assume that, for example, $C_i$ is the number of clock pulses counted by the counter 56. During the next cycle, during the second transmission frame, the station selects the signal on the output $(n-C_i+1)$ of the register 60 for the control of the register 63, so that a first provisional locking operation can be performed with an accuracy of one bit; the bit counter 56 indicates the value 1 during the second receiving frame and a memory 61 which is connected between this counter 56 and the multiplexer 62 stores the command of this multiplexer.

Figure 7:
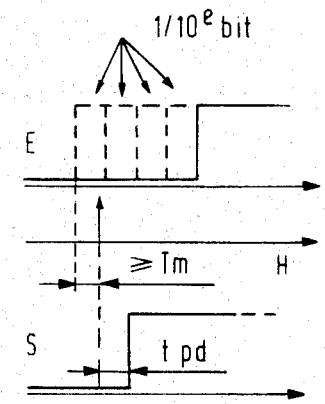
FIG. 7 shows the timing diagram of the automatic time locking of a station.

For suitable operation of the bus it is necessary to use a locking accuracy of better than one bit; therefore, a final locking operation is performed as follows. The output of the shift register 63 is applied to a delay line 64 whose total delay equals one bit and which comprises ten intermediate outputs with steps of 1/10 bit which are multiplexed in a multiplexer 65. For each transmission frame, a frame counter 57 which starts only when the counter 56 has passed 1 selects the preceding intermediate output of the delay line 64, so that the transmission is advanced by each time 1/10 bit (see FIG. 7). For as long as the first bit of the transmitted slot does not occupy a correct position with respect to the clock signal (in order to be taken into account by a clock signal), a signal must precede this clock signal by at least a given time interval; this minimum time Tm before which the clock signal does not "see" said signal is referred to as the set-up time; the signal thus taken into account does not appear until after a period $t_{pd}$ which represents the propagation time of the signal with respect to the clock), the looping unit 17 repeats only (24-1) bits of the word during its demodulation and retransmission phase. When this phase is finally correct, the bit counter 57 of the station assumes the low level "0" (the command of the multiplexer 65 again being stored by means of a memory 58 which is connected between the counter 57 and this multiplexer) and despatches command to the counter 57 in order to terminate counting. The automatic time-locking of this station is then terminated.

It is to be noted that the present invention is by no means limited to the embodiment described above; many alternatives are possible within the scope of the present invention. Notably when the links are formed by cables instead of optical fibers, the invention can be used equally well without requiring modifications other than the use of components other than opto-electronic components.

What is claimed is:

1. In a local loop network comprising a plurality of stations which are distributed along a bus, each station being connected to the bus by way of a coupler, said bus comprising a looping unit inserted in the bus, a method for the time-locking of the stations, said method including an initialization phase for allocating to each station a time reference with respect to a master clock of the looping unit, characterized in that the initialization phase forms part of a transmission phase which comprises the following steps:
   (a) the transmission of a frame, referred to as the transmission frame, by the looping unit, said transmission frame comprising:
      a synchronization word which initializes the transmission and initialization phase,
      at least one slot which initially does not contain data and which has for each station a different position with respect to the position of the synchronization word, said position corresponding to the time position occupied by each station in the transmission frame;
   (b) the generating of a transmission command by at least one station after the transmission of the synchronization word;
   (d) the insertion, by the station and under the control of the transmission command, of a word into the empty slot allocated to the station;
said transmission phase being followed by a receiving phase which comprises the following steps:
   (a) the demodulation of the transmission frame by the looping unit;
   (b) the retransmission, in the form of a frame which is referred to as the receiving frame, of said demodulated transmission frame by the looping unit,
   (c) the measurement by the station of the delay, with respect to the beginning of the slot allocated thereto, with which the word has been inserted into the allocated slot by the station during the transmission phase;
   (d) the storage by the station of the measured delay value in order to enable the station to advance the insertion of the word into the allocated slot during a next transmission by a period which corresponds to the delay value.

2. A time-locking method as claimed in claim 1, characterized in that a word inserted during the insertion step of the transmission phase comprises several bits, said word being inserted with a delay of several bits with respect to the beginning of said empty slot, said measurement of the delay during the receiving phase being a measurement based on the number of bits of delay, said receiving phase being followed by a further transmission phase which comprises the following steps:
   (a) the transmission of a new transmission frame by the looping unit, said new transmission frame comprising:
      a synchronization word which initializes the transmission phase;
      at least one said slot which initially does not contain data;
   (b) the determination, taking into account the measured value of the delay, of the instant at which the transmission command must be generated;
   (c) the generating of the transmission command;
   (d) the insertion of a word into the empty slot allocated to the station with a delay which is less than or equal to one bit with respect to the beginning of said empty slot and under the control of the transmission command;
said further transmission phase being followed by the receiving phase.

3. A time-locking method as claimed in claim 2, characterized in that the receiving phase following the further transmission phase is followed by so many further transmission phases and receiving phases that the first bit of the word inserted in the allocated slot occupies a correct position with respect to the beginning of the slot and that the complete word is inserted in the slot allocated to the station.

4. A time-locking method as claimed in claim 3, characterized in that the word is inserted with a delay of less than one tenth of a bit.

5. A time-locking method as claimed in any one of the preceding claims, characterized in that said measurement of the delay is performed by counting the clock pulses which separate the beginning of the allocated slot from the beginning of the word inserted in the slot.

6. A local loop network comprising a plurality of stations which are distributed along a bus, each station being connected to the bus by way of a coupler, said bus comprising a looping unit which comprises;

first transmission means for transmitting a transmission frame comprising a synchronization word and at least one slot which initially does not contain data and which has for each station a different position with respect to the position of the synchronization word, said position corresponding to the time position occupied by each station in the transmission frame;

receiving means for receiving a receiving frame comprising a transmission frame which has made at least one revolution through the loop and which comprises at least one slot wherein a word has been inserted by a station which did receive the transmission frame;

a demodulator for generating a demodulated frame of said receiving frame;

second transmission means for transmitting said demodulated frame; and each station comprises:

insertion means for inserting a word into the empty slot allocated to the station;

measuring means for measuring in a demodulated frame the delay, with respect to the beginning of the slot allocated thereto, with which the word has been inserted by the station into the allocated slot of a transmission frame;

storage means for storing said measured delay; and enabling means connected with said insertion means and said storage means, said enabling means being provided for enabling said insertion means to advance said insertion by a time duration which corresponds to the stored delay value.

7. A local loop network as claimed in claim 6, wherein each station further comprises:

(a) a slot control device which serves to verify whether the slots appearing are indeed those which have been allocated to that section;

(b) a counter for counting in a received demodulated frame the delay between the beginning of the slot and the beginning of the word inserted in the slot, an input of said counter being connected to the slot control device in order to receive a signal indicating the beginning of the allocated slot; and (c) a locking device which comprises a first input which is connected to the output of said counter in order to receive the delay value and a second output which is connected to the slot control device in order to receive a signal which indicates the beginning of the allocated slot, said locking device comprising a generator for generating transmission commands, an output of said locking device being connected to the coupler.

8. A local loop network as claimed in claim 7, wherein said generator of said locking device comprises:

(a) a first shift register which comprises a parallel input and a series output for the storage of the word to be inserted;

(b) a second shift register which comprises several parallel, shifted outputs which are connected, by way of a first multiplexer, to a control input of the first register;

(c) a pulse generator for generating pulses at a signalization frequency, an output of said generator being connected to the first and the second shift register and also to the counter;

and storage means comprises a memory having an input connected to the counter in order to receive the delay value, an output connected to the first multiplexer in order to select a parallel output of the second shift register.

9. A local loop network as claimed in claim 6, 7 or 8, wherein the slot control device comprises a first and a second counter which counts at the word frequency, an input thereof being connected to the coupler while an output is connected to a first and to a second verification circuit, respectively.

10. A local loop network as claimed in claim 8, wherein the series output of the first shift register is connected to an input of a delay line having a series input and parallel outputs shifted through a fraction of the maximum delay of said delay line, said parallel shifted outputs of said delay line being connected to a second multiplexer, an output of which is connected to the coupler and a control input of which is connected to the counter via the memory.

11. A local loop network as claimed in claim 6, 7 or 8, wherein the slot control device comprises a first and a second counter which counts at the word frequency, an input thereof being connected to the coupler while an output is connected to a first and to a second verification circuit, respectively and the series output of the first shift register is connected to an input of a delay line having a series input and parallel outputs shifted through a fraction of the maximum delay of said delay line, said parallel shifted outputs of said delay line being connected to a second multiplexer, an output of which is connected to the coupler and a control input of which is connected to the counter via the memory, said bus being an optical bus.

12. A local loop network as claimed in any of the claims 6, 7 or 8, wherein said bus is an optical bus.

* * * * *